United States Patent
Lawrence et al.

(10) Patent No.: US 9,426,092 B2
(45) Date of Patent: *Aug. 23, 2016

(54) SYSTEM AND METHOD FOR SWITCHING TRAFFIC THROUGH A NETWORK

(75) Inventors: Joseph Lawrence, Boulder, CO (US); Christopher J. Gibbings, Westminster, CO (US); Niclas Comstedt, Broomfield, CO (US); Nassar El-Aawar, Denver, CO (US)

(73) Assignee: Level 3 Communications LLC, Broomfield, CO (US)

( * ) Notice: Subject to any disclaimer, the term of this patent is extended or adjusted under 35 U.S.C. 154(b) by 1055 days.

This patent is subject to a terminal disclaimer.

(21) Appl. No.: 11/933,020

(22) Filed: Oct. 31, 2007

(65) Prior Publication Data

US 2008/0151863 A1    Jun. 26, 2008

Related U.S. Application Data

(63) Continuation-in-part of application No. 11/347,810, filed on Feb. 3, 2006, and a continuation-in-part of application No. 11/565,563, filed on Nov. 30, 2006.

(60) Provisional application No. 60/894,223, filed on Mar. 11, 2007.

(51) Int. Cl.
*H04L 12/28* (2006.01)
*H04L 12/933* (2013.01)
*H04L 12/931* (2013.01)

(52) U.S. Cl.
CPC .......... *H04L 49/15* (2013.01); *H04L 49/1515* (2013.01); *H04L 49/1523* (2013.01); *H04L 49/35* (2013.01); *H04L 49/602* (2013.01)

(58) Field of Classification Search
None
See application file for complete search history.

(56) References Cited

U.S. PATENT DOCUMENTS 4,639,881 A    1/1987    Zingher
4,998,242 A    3/1991    Upp (Continued)

FOREIGN PATENT DOCUMENTS

JP    2000-165412    6/2000
JP    2004/507136    3/2004

(Continued)

OTHER PUBLICATIONS

"Canadian Office Action dated May 28, 2010", counterpart application No. 2,657,111, originally filed Feb. 5, 2007, Systems and Methods for Network Routing in a Multiple Backbone Network Architecture, , 5 pgs.

(Continued)

*Primary Examiner* — Christopher Crutchfield
*Assistant Examiner* — Thinh Tran

(57) ABSTRACT

Embodiments of the present invention generally relate to network communications. More specifically, embodiments relate to a system and method for switching data through a network. An embodiment of a switching system communicatively couples an external network to a wide area network. The system includes a plurality of edge switches communicatively coupled to the external network, a plurality of core switches communicatively coupled to the wide area network, and an interconnected matrix of switches communicatively coupled to the core switches and the edge switches and configured to forward communication traffic between the edge switches and the core switches.

11 Claims, 8 Drawing Sheets

(56) References Cited

U.S. PATENT DOCUMENTS

| | | |
|---|---|---|
| 5,068,916 A | 11/1991 | Harrison |
| 5,119,370 A | 6/1992 | Terry |
| 5,276,445 A | 1/1994 | Mita |
| 5,467,347 A | 11/1995 | Petersen |
| 5,541,914 A | 7/1996 | Krishnamoorthy et al. |
| 5,845,215 A | 12/1998 | Henry |
| 5,999,103 A | 12/1999 | Croslin |
| 6,016,307 A | 1/2000 | Kaplan et al. |
| 6,151,324 A | 11/2000 | Belser et al. |
| 6,335,992 B1 | 1/2002 | Bala et al. |
| 6,574,335 B1 | 6/2003 | Kalmanek, Jr. et al. |
| 6,600,741 B1 | 7/2003 | Chrin et al. |
| 6,665,273 B1 | 12/2003 | Goguen et al. |
| 6,781,984 B1 | 8/2004 | Adam et al. |
| 6,981,055 B1 | 12/2005 | Ahuja et al. |
| 6,982,974 B1 | 1/2006 | Saleh et al. |
| 7,020,087 B2 | 3/2006 | Steinberg et al. |
| 7,027,396 B1 | 4/2006 | Golan et al. |
| 7,106,729 B1 * | 9/2006 | Gullicksen et al. .......... 370/388 |
| 7,307,948 B2 | 12/2007 | Infante |
| 7,342,922 B1 | 3/2008 | Vanesko |
| 7,424,010 B2 | 9/2008 | Konda |
| 7,436,838 B2 | 10/2008 | Filsfils et al. |
| 7,552,262 B1 * | 6/2009 | Turner ................... H04L 49/10 370/351 |
| 7,554,930 B2 | 6/2009 | Gaddis et al. |
| 7,596,135 B1 | 9/2009 | Iovine et al. |
| 7,626,936 B1 | 12/2009 | Golan et al. |
| 7,630,392 B2 | 12/2009 | Raza |
| 7,839,869 B1 * | 11/2010 | Fotedar ................... H04L 45/38 370/389 |
| 7,953,103 B2 | 5/2011 | Raza |
| 8,135,005 B2 * | 3/2012 | Okagawa .......... H04L 29/12009 370/216 |
| 2002/0075540 A1 | 6/2002 | Munter |
| 2002/0085498 A1 * | 7/2002 | Nakamichi ......... H04L 12/2602 370/236 |
| 2002/0126674 A1 * | 9/2002 | Hemmady ................ 370/395.1 |
| 2002/0184393 A1 | 12/2002 | Leddy et al. |
| 2002/0186433 A1 * | 12/2002 | Mishra .......................... 359/128 |
| 2002/0197001 A1 * | 12/2002 | Hayashi et al. ................ 385/17 |
| 2003/0058880 A1 * | 3/2003 | Sarkinen et al. ............. 370/413 |
| 2003/0152071 A1 * | 8/2003 | Lu ....................... H04L 49/1515 370/380 |
| 2003/0174715 A1 | 9/2003 | Yazaki |
| 2003/0179759 A1 | 9/2003 | Wang |
| 2004/0008674 A1 | 1/2004 | Dubois |
| 2004/0105456 A1 | 6/2004 | Lanzone et al. |
| 2004/0136385 A1 | 7/2004 | Xue et al. |
| 2004/0264448 A1 * | 12/2004 | Wise et al. ..................... 370/386 |
| 2005/0002334 A1 | 1/2005 | Chao et al. |
| 2005/0050243 A1 | 3/2005 | Clark |
| 2005/0063395 A1 | 3/2005 | Smith et al. |
| 2005/0068960 A1 * | 3/2005 | Green et al. ............... 370/395.2 |
| 2005/0111465 A1 * | 5/2005 | Stewart ......................... 370/400 |
| 2005/0135405 A1 | 6/2005 | Galand et al. |
| 2005/0152305 A1 | 7/2005 | Ji et al. |
| 2005/0201302 A1 | 9/2005 | Gaddis et al. |
| 2005/0220096 A1 | 10/2005 | Friskney et al. |
| 2005/0254527 A1 | 11/2005 | Jakel et al. |
| 2006/0008273 A1 | 1/2006 | Xue et al. |
| 2006/0074618 A1 | 4/2006 | Miller et al. |
| 2006/0104281 A1 | 5/2006 | Scarr et al. |
| 2006/0140136 A1 | 6/2006 | Filsfils et al. |
| 2006/0153067 A1 | 7/2006 | Vasseur et al. |
| 2006/0153200 A1 | 7/2006 | Filsfils et al. |
| 2006/0165087 A1 | 7/2006 | Page et al. |
| 2006/0200579 A1 | 9/2006 | Vasseur |
| 2006/0209687 A1 | 9/2006 | Yagawa et al. |
| 2006/0209816 A1 | 9/2006 | Li et al. |
| 2006/0215672 A1 | 9/2006 | Lawrence et al. |
| 2007/0064688 A1 | 3/2007 | Prettegiani |
| 2007/0086429 A1 | 4/2007 | Lawrence et al. |
| 2008/0212472 A1 | 9/2008 | Musacchio et al. |
| 2008/0267204 A1 | 10/2008 | Hall et al. |
| 2008/0316914 A1 | 12/2008 | Vercellone et al. |
| 2008/0320166 A1 | 12/2008 | Filsfils et al. |
| 2009/0141632 A1 | 6/2009 | Lawrence et al. |

FOREIGN PATENT DOCUMENTS

| | | |
|---|---|---|
| JP | 2004/350078 | 12/2004 |
| WO | 02/17110 A1 | 2/2002 |
| WO | WO 02/15017 | 2/2002 |
| WO | WO 2006084071 | 8/2006 |

OTHER PUBLICATIONS

"Canadian Office Action dated Sep. 21, 2010", counterpart application No. 2,595,788, originally filed Feb. 3, 2006, Ethernet-Based Systems and Methods for Improved Network Routing , 2 pgs.

"Chinese Office Action dated Dec. 22, 2010,", counterpart application No. 200780025193.4, originally filed Feb. 5, 2007, Systems and Methods for Network Routing in a Multiple Backbone Network Architecture, ,5 pgs.

"Chinese Office Action dated Jan. 18, 2011,", counterpart CN application No. 200680003986.1, filed Feb. 3. 2006, ,11 pgs.

"Claims 1-16 as filed in Canadian counterpart", patent application No. 2,595,788, filed Feb. 3, 2006, Ethernet-Based Systems and Methods for Improved Network Routing , pp. 8-10.

"European Examination Report dated Dec. 9, 2009,", counterpart EP application No. 06720174.9, Referring to European Search Report of Jul. 30, 2009, Ethernet-Based Systems and Methods for Improved Network Routing, ,1 pg.

"European Examination Report dated Feb. 7, 2011,", counterpart EP application No. 07710455.2, ,4 pgs.

"European Examination Report dated Jul. 15, 2010,", counterpart EP application No. 07710455.2, Systems and Methods for Network Routing in a Multiple Backbone Architecture, ,7 pgs.

"European Extended Search Report dated Nov. 22, 2010,", counterpart EP application No. 07864928.2, System and Method for Switching Traffic Through a Network , 3 pgs.

"European Search Report dated Apr. 16, 2010", counterpart EP application No. 07710455.2, Systems and Methods for Network Routing in a Multiple Backbone Architecture , 11 pgs.

"European Search Report dated Jul. 30, 2009,", counterpart EP application No. 06720175.9, Ethernet-Based Systems and Methods for Improved Network Routing, ,6 pgs.

"European Written Opinion, dated Nov. 22, 2010,", counterpart EP application No. 07864928.2, System and Method for Switching Traffic Through a Network, ,4 pgs.

"Japanese Office Action dated May 11, 2010,", counterpart JP application No. 2007-554219, Ethernet-Based Systems and Methods for Improved Network Routing, ,4 pgs.

"US Office Action dated Oct. 8, 2010,", counterpart U.S. Appl. No. 11/565,563, Systems and Methods for Network Routing in a Multiple Backbone Network Architecture, ,17 pgs.

"US Office Action mailed Jun. 1, 2009,", in counterpart U.S. Appl. No. 11/347,810, filed Feb. 3, 2006, 25 pgs.

Rekhter, Y. et al., "A Border Gateway Protocol 4 (BGP-4)", T.J. Watson Research Center, IBM Corp., Cisco Systems Editors Mar. 1995 , 58 pgs.

Walker, Paul , "Interface for Home Network", *IEEE 1355, Nikei Electronics* vol. 589, May 19, 1997 , pp. 71-183.

International Searching Authority, U.S. Patent and Trademark Office and Receiving Office, International Search Report (Form PCT/ISA/210) for international application No. PCT/US07/61629, Feb. 26, 2008, 4 pages.

International Searching Authority, U.S. Patent and Trademark Office and Receiving Office, Written Opinion of the International Searching Authority (Form PCT/ISA/237) for international application No. PCT/US07/61629 Feb. 26, 2008, 8 pages.

International Searching Authority, U.S. Patent and Trademark Office and Receiving Office, International Search Report (Form PCT/ISA/210) for International Application No. PCT/US07/85977, Apr. 30, 2008, 3 pages.

International Searching Authority, U.S. Patent and Trademark Office and Receiving Office, Written Opinion of the International

(56) References Cited

OTHER PUBLICATIONS

Searching Authority (Form PCT/ISA/237) for international application No. PCT/US07/85977, Apr. 30, 2008, 4 pages.
International Searching Authority, U.S. Patent and Trademark Office and Receiving Office, International Search Report (Form PCT/ISA/210) for International Application No. PCT/US06/03740, Jul. 27, 2008, 2 pages.
International Searching Authority, U.S. Patent and Trademark Office and Receiving Office, Written Opinion of the International Searching Authority (Form PCT/ISA/237) for international application No. PCT/US06/03740, Jul. 27, 2008, 4 pages.
Cisco Systems, Inc., Cisco IOS Software Releases 12.1T, Virtual Switch Interface Master MIB Feature Guide, 9 pages, retrieved Aug. 27, 2007 from URL: <http://www.cisco.com/en/US/products/sw/iosswrel/ps1834/products_feature_guide09186a.
Cisco Systems, Inc., Cisco Packet Telephone Center Virtual Switch Version 3.1 Data Sheet, 7 pages, retrieved Aug. 27, 2007 from URL: <http://www.cisco.com/en/US/products/sw /netmgtsw/ps2025/products_data_sheet09186a00.
Non-Final Office Action mailed Sep. 15, 2008, U.S. Appl. No. 10/347,810, filed Feb. 3, 2006, Applicant: Joseph Lawrence et al., 16 pages.
European Search Report, The Hague, EPP290990, Mar. 2, 2006, Jul. 22, 2009, 6 pages.
McDermott, Tom and Brewer, Tony, "Large-scale IP router using a high-speed optical switch element [Invited]", Journal of Optical Networking, vol. 2, Issue 7, Jul. 2003, XP 008108607, pp. 229-240.
Smiljanic A., "Load balancing mechanisms in close packet switches", Communications, 2004 IEEE International Conference on Paris France, Jun. 20-24, 2004, Piscataway NJ, USA, IEEE, vol. 4, Jun. 20, 2004, XP010712226, ISBN 978-0/7803-8533-7, p. 2251-2255.
Non-Final Office Action mailed Apr. 3, 2009, U.S. Appl. No. 11/565,563, filed Nov. 30, 2006, Applicant Joseph Lawrence, 35 pages.
Non-Final Office Action mailed Sep. 15, 2008, U.S. Appl. No. 10/347,810, filed Feb. 3, 2006, Applicant Joseph Lawrence, 16 pages.

"Canadian Examination Report dated Mar. 4, 2011", CA Appl. No. 2655984, 3 pgs.
"Japanese Office Action, dated Mar. 22, 2011", JP Appl. No. 2007/554219, 6 pgs.
"European Exam Report, dated May 2, 2011", EP App. No. 06720174.9, 6 pgs.
Nenov, G. "Transporting Ethernet services in metropolitan area networks", *Networks, 2004. (ICON 2004). Proceedings. 12th IEEE International Conf Erence on Singapore Nov. 16-19, 2004*, 53-59 pgs.
Nitzberg, B. "The P-Mesh-a commodity-based scalable network architecture for clusters", *Systems Sciences, 1999. HICSS-32. Proceedings of the 32nd Annual Hawai I International Conference on Maui, HI, USA* Jan. 5, 1999 , 10 pgs.
"Canadian Examination Report dated Jul. 28, 2011,", Application No. 2,595,788, filed Feb. 3, 2006, 2 pgs.
"Chinese Exam Report, dated Apr. 26, 2011", App. No. 200780025093.1, 20 pgs.
Chinese Examination Report dated Apr. 27, 2012, CN Appl. No. 200780025093.1, 4 pgs.
Chinese Examination Report, dated Mar. 20, 2013, Application No. 200780025093.1, 5 pgs.
Canadian Examination Report, dated May 8, 2013, Application No. 2,657,111, 2 pgs.
U.S. Appl. No. 13/601,806, filed Aug. 31, 2012, "Systems and Methods for Network Routing in a Multiple Backbone Network Architecture," 41 pgs.
Extended European Search Report, dated Jun. 18, 2013, Application No. 12177337.8, 6 pgs.
Chinese Examination Report, dated Sep. 14, 2012, Application No. 200780025193.4, 2 pgs.
Canadian Office Action, dated Mar. 19, 2012, Application No. 2,657,111, 3 pgs.
Canadian Office Action, dated Mar. 21, 2012, Application No. 2,595,788, 2 pgs.
Canadian Examination Report, dated Apr. 1, 2014, Application No. 2,657,111, filed Feb. 5, 2007; 2 pgs.
European Examination Report, dated Nov. 16, 2015, Application No. 06720174.9, filed Feb. 3, 2006; 4 pgs.

* cited by examiner

SYSTEM AND METHOD FOR SWITCHING TRAFFIC THROUGH A NETWORK

CROSS REFERENCE TO RELATED APPLICATIONS

This application is a continuation in part of U.S. patent application Ser. No. 11/347,810, filed Feb. 3, 2006, entitled "Ethernet-Based Systems and Methods for Improved Network Routing", and U.S. patent application Ser. No. 11/565,563, filed Nov. 30, 2006, entitled "Systems and Methods for Network Routing in a Multiple Backbone Network Architecture". This application claims benefit of priority from U.S. Provisional Patent Application Ser. No. 60/894,223, filed Mar. 11, 2007, entitled "Scalable Network Node Configurations". All of the aforementioned patent applications are incorporated herein by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2007 Level 3 Communications, LLC.

TECHNICAL FIELD

Embodiments of the present invention generally relate to network communications. More specifically, embodiments relate to a system and method for switching data through a network.

BACKGROUND

Communication traffic volume over the Internet continues to grow rapidly. For example, growth in demand can be attributed in part to users' increasing demand for rich content over the Internet from video sharing web sites, pod casters and other content distributors and providers. In addition, sites devoted to social networking continue to grow in popularity, thereby contributing to increasing demand in online use. Furthermore, users are accessing the Internet through more and varied types of end-user devices, such as portable handheld computing devices, and the communication and computing options available to users continue to increase. As a result, users are accessing a broader range of Internet resources from ever-increasing points of access.

Network service providers (NSPs), such as Internet service providers (ISPs), wholesale NSPs, and backbone network operators, must adapt their networks in response to increases in communication traffic volume. More specifically, providers should be able to accommodate growth in communication traffic while maintaining the same relative service levels at roughly the same cost or lower cost. Given the relatively high capital costs associated with network implementation, integration and maintenance, and uncertainty in the trend in communication traffic it can be difficult to know what configuration of network components will provide both scalability (ability to grow with increases in traffic demand) and low cost.

It is with respect to these and other problems that embodiments of the present invention have been created.

SUMMARY

Embodiments of the present invention generally relate to network communications. More specifically, embodiments relate to a system and method for switching data through a network.

An embodiment of a switching system communicatively couples an external network to a wide area network. The system includes a plurality of edge switches communicatively coupled to the external network, a plurality of core switches communicatively coupled to the wide area network, and an interconnected matrix of switches communicatively coupled to the core switches and the edge switches and configured to forward communication traffic between the edge switches and the core switches.

In an embodiment of a system each of the edge switches, core switches and interconnected matrix of switches is an independent switching element. Each of the edge switches, core switches and interconnected matrix of switches can build or maintain a forwarding table by exchanging route information with the other switches. The interconnected matrix of switches can include one or more of a full mesh, a partial mesh, a star, a ring, a n-cube, a toroid, a CLOS-like matrix, or an arbitrary mesh configuration. The switches in the interconnected matrix may forward communication traffic using one or more of an Ethernet protocol, an MPLS protocol, on a nonproprietary protocol. The interconnected matrix of switches may be part of or form a Local Area Network (LAN). The external network may include one of a metropolitan area network, a campus area network, an enterprise network or a personal area network.

In an embodiment of a system the edge switches and the core switches forward communication traffic using one or more of an Ethernet protocol, an MPLS protocol, an Internet Protocol, or a nonproprietary protocol. Each of the edge switches and the core switches may include its own forwarding table. The interconnected matrix of switches may include multiple stages of switches. In some embodiments, the interconnected matrix of switches includes ports facing the wide area network and ports facing the external network, and wherein each of the ports facing the wide area network are connected to a port on a core switch and each of the ports facing the external network are connected to a port on an edge switch.

In an embodiment of a system the edge switches, the interconnected matrix of switches, and core switches are housed in separate chassis. The edge switches may form an edge switching stage, the interconnected matrix of switches may form one or more middle switching stages, and the plurality of core switches may form a core switching stage. The independent switching elements may be scaled according to the number of switches at each stage in the interconnected matrix of switches.

An embodiment of a network architecture includes a wide area network, a plurality of local networks configured to communicate over the wide area network, and a plurality of switching stages communicatively coupling the local networks to each other over the wide area network, wherein local groups of switching stages communicatively couple associated local networks to the wide area network. Each of the local networks may be in a different metropolitan area. Each group of stages may include an interconnected matrix of switches. In some embodiments at least one interconnected matrix of switches is directly connected to at least one other interconnected matrix of switches over the wide area network.

In an embodiment of a network architecture, connections between interconnected matrices of switches include one or more of a braid topology or a ladder topology. Each switch may be configured to build its own forwarding table. Each interconnected matrix of switches may form a topology including one or more of a ring, a star, a full mesh, a partial mesh, an arbitrary mesh, a CLOS-like matrix, an n-cube, or a hybrid. In some embodiments at least one group of stages includes an edge stage, a middle stage and a core stage. In these embodiments, switches of the middle stage may have a plurality of ports facing the wide area network and a plurality of ports facing the local network, and each port facing the wide area network may be connected to a port on a switch in the core stage and each port facing the local network may be connected to a port on a switch in the edge stage. In an embodiment of a network architecture at least one of multiple switching stages includes a plurality of Ethernet switches.

Figure 1:
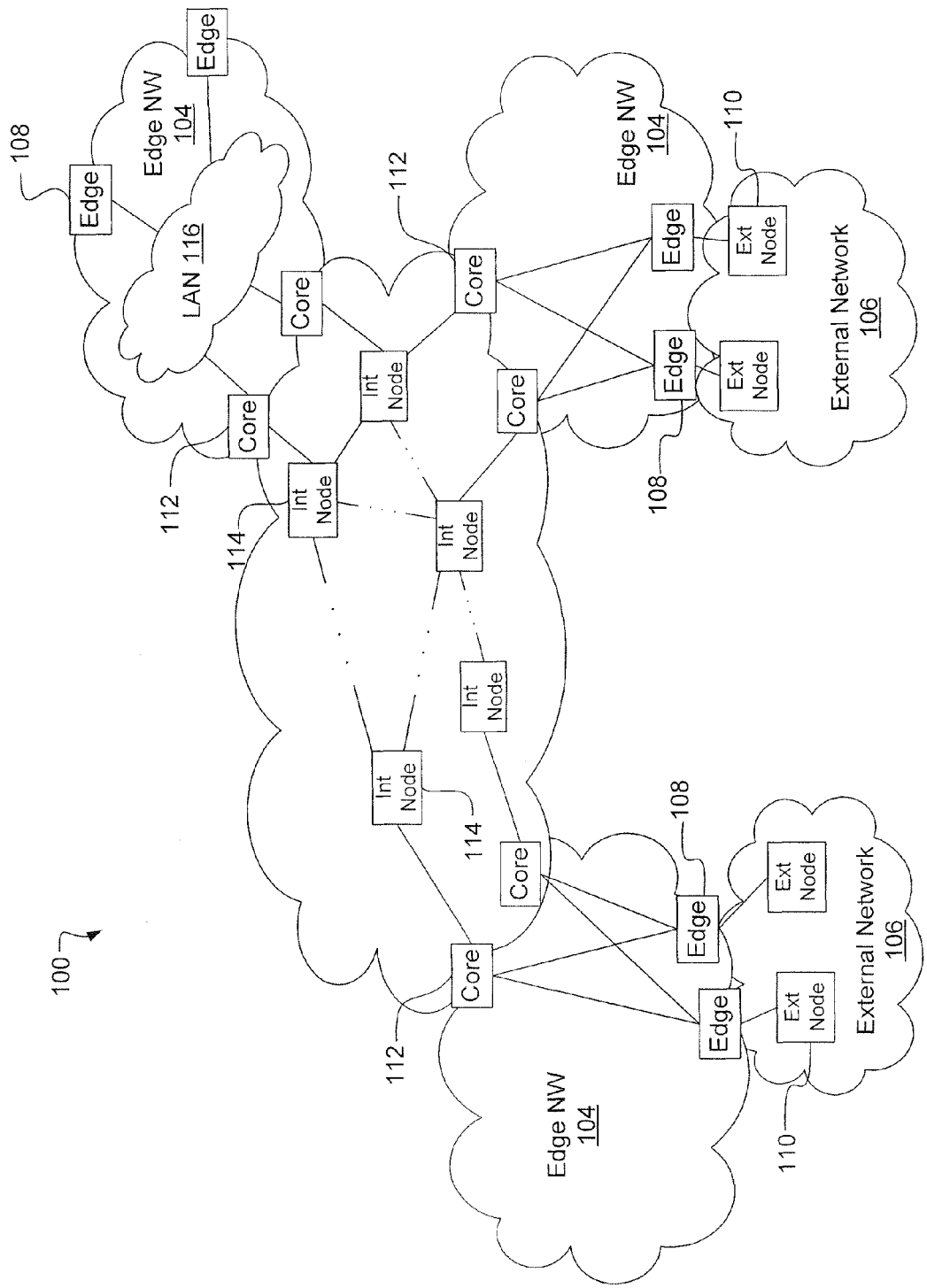
FIG. 1 illustrates an operating environment suitable for implementing embodiments of the present invention.

While the invention is amenable to various modifications and alternative forms, specific embodiments have been shown by way of example in the drawings and are described in detail below. The intention, however, is not to limit the invention to the particular embodiments described.

DETAILED DESCRIPTION

Embodiments of the present invention relate to switching (e.g., forwarding) data through a network. More specifically, embodiments relate to systems and methods for forwarding traffic through multi-stage switching systems. In various embodiments, the multi-stage switching systems can include one or more inner stages. The inner stages may include a cluster of parallel switches. The cluster of parallel switches may comprise an interconnected matrix of switches forming one or more topologies. One or more of the switch stages may be housed in its own chassis. Such a system is referred to as a multi-chassis switch system. Each switch stage can be loosely coupled to the other stages and a nonproprietary protocol can be used. Packets can be forwarded through the stages using Internet Protocol, MPLS, or other protocols.

Using multiple chassis with standard interfaces (e.g., not proprietary) provides for multi-generation, multi-vendor configurations. In such embodiments each stage can include a different vendor or generation of line cards or switch cards. Inner stages can be composed of alternate mesh topologies, such as, but not limited to toroidal mesh, ring, star, N stage Clos matrix, or equal path Clos. Forwarding logic in an initial stage of line cards may be simplified to a "next hop" analysis, wherein the line cards determine which of N switch ports to forward each packet. The forwarding logic is scalable as the parallel cluster of switches scales.

In some embodiment, commodity switches can be used. Such embodiments can reduce cost, while allowing for scaling up in response to traffic growth and achieving efficiency in forwarding traffic between large metropolitan areas. For example, Ethernet switches are typically less expensive than most commercial IP routers. For less cost, substantially the same amount of capacity can be obtained using commodity switches, as compared to many commercial routers. In addition, the parallel clustered configuration allows for N:1 protection of the edge switches, instead of 1:1, with a relatively small reduction in capacity.

Prior to describing one or more preferred embodiments of the present invention, definitions of some terms used throughout the description are presented.

Definitions

The term "network service provider" refers to an organization that provides access to one or more networks. An NSP may operate, maintain or lease a network coupled to a plurality of other networks, whereby communication traffic can be communicated to and from the various networks.

The term "facing" is used in a logical sense and not a physical sense to describe the communicative orientation of ports.

A "bundle" or similar terms refer to one or more physical links.

A "module" is a self-contained functional component. A module may be implemented in hardware, software, firmware, or any combination thereof.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The terms "responsive" and "in response to" includes completely or partially responsive.

The term "computer-readable media" is media that is accessible by a computer, and can include, without limitation, computer storage media and communications media. Computer storage media generally refers to any type of computer-readable memory, such as, but not limited to, volatile, non-volatile, removable, or non-removable memory. Communication media refers to a modulated signal carrying computer-readable data, such as, without limitation, program modules, instructions, or data structures.

Exemplary System

FIG. 1 illustrates an exemplary operating environment 100 in which embodiments of the present invention may be implemented. The operating environment 100 shown in FIG. 1 is presented for illustrative purposes only and is not intended to limit the invention for use in any particular environment. Embodiments may be used in many other environments, such as, but not limited to, data centers, corporate networks, and interexchange points.

The illustrated operating environment 100 includes a wide area network composed of a wide area network (WAN) 102 (e.g., a backbone network) and multiple edge networks 104. The edge networks 104 are communicatively located between external networks 106 and the WAN 102, whereby communication traffic traveling to and from the WAN 102 to the external networks 106 (and vice versa) traverse the respective edge networks 104. The term "external" is used to indicate a node is external to the WAN formed by the WAN 102 and the edge networks 104.

In some embodiments one or more of the external networks 106 is an Internet service provider (ISP) network (e.g., tier 1, tier 2 or tier 3 ISP). In other embodiments, one or more of the external networks 106 include, by way of example, but not limitation, one or more of a metropolitan area networks (MAN), campus area network (CAN), personal area networks (PAN), enterprise network, home or office network.

In accordance with various embodiments, the WAN 102 may span a relatively large geographic area that may include multiple distinct areas, such as metropolitan areas, campuses or enterprise locations. The edge networks 104 provide links between the WAN 102 and external networks 106 in the geographic regions. An example of an edge network 104 is a Point-of-Presence (POP) facility. As discussed further below, an edge network 104 can include one or more switching nodes that include multiple switching stages. These stages generally include one or more edge nodes 108 and one or more core nodes 112.

In the illustrated embodiment, the edge nodes 108 are coupled to one or more external nodes 110 of external networks 106. External nodes 110 may be routers, switches or other network devices. Core nodes 112 communicatively couple the edge network 104 to the WAN 102. In some embodiments core nodes 112 are communicatively coupled to internal nodes 114 of the WAN 102. As discussed further below, core nodes 112 in one area (e.g., metropolitan area) may be connected directly to core nodes 112 of another area via link bundles (e.g., link aggregation group (LAG)) in accordance with a multi-stage switching embodiment.

Internal nodes 114 are typically, by way of example, routers or switches that preferably forward traffic at high speed through the WAN 102. The embodiment shown in FIG. 1 includes only a small number of internal nodes 114, core nodes 112, edge nodes 108 and external nodes 110, but in actual operation, there will be many more of these types of nodes.

In accordance with some embodiments, edge nodes 108 may be communicatively coupled to core nodes 112 via a local area network (LAN) 116. In such embodiments, the LAN 116 includes switches that forward packets between edge nodes 108 and core nodes 112 using one or more communication protocols. In various embodiments, the switches in the LANs 116 may perform Internet protocol (IP) forwarding, or some other buffered forwarding protocol, such as Multi-protocol label switching (MPLS), or some combination of those protocols.

In various embodiments, edge nodes 108 and core nodes 112 of the edge network 104 form a switch cluster. In accordance with these embodiments, multiple switches can be installed at each of one or more switching stages in the edge network 104. Packets traversing the edge network 104 can be switched in a "next-hop" fashion whereby packets are forwarded to the next stage using a non-proprietary protocol. Each stage may be implemented in a separate chassis that is accessible for adding and removing switch cards (e.g., Ethernet cards), to allow for easy scaling and multi-generational and multi-vendor implementations.

In some embodiments, switch stages can be logically extended across the WAN 102. Switch stages in one local area may be directly connected to switch stages in another local area across the WAN 102. In such embodiments, switch stages in the two areas are part of a single mesh of switches.

Figure 2:
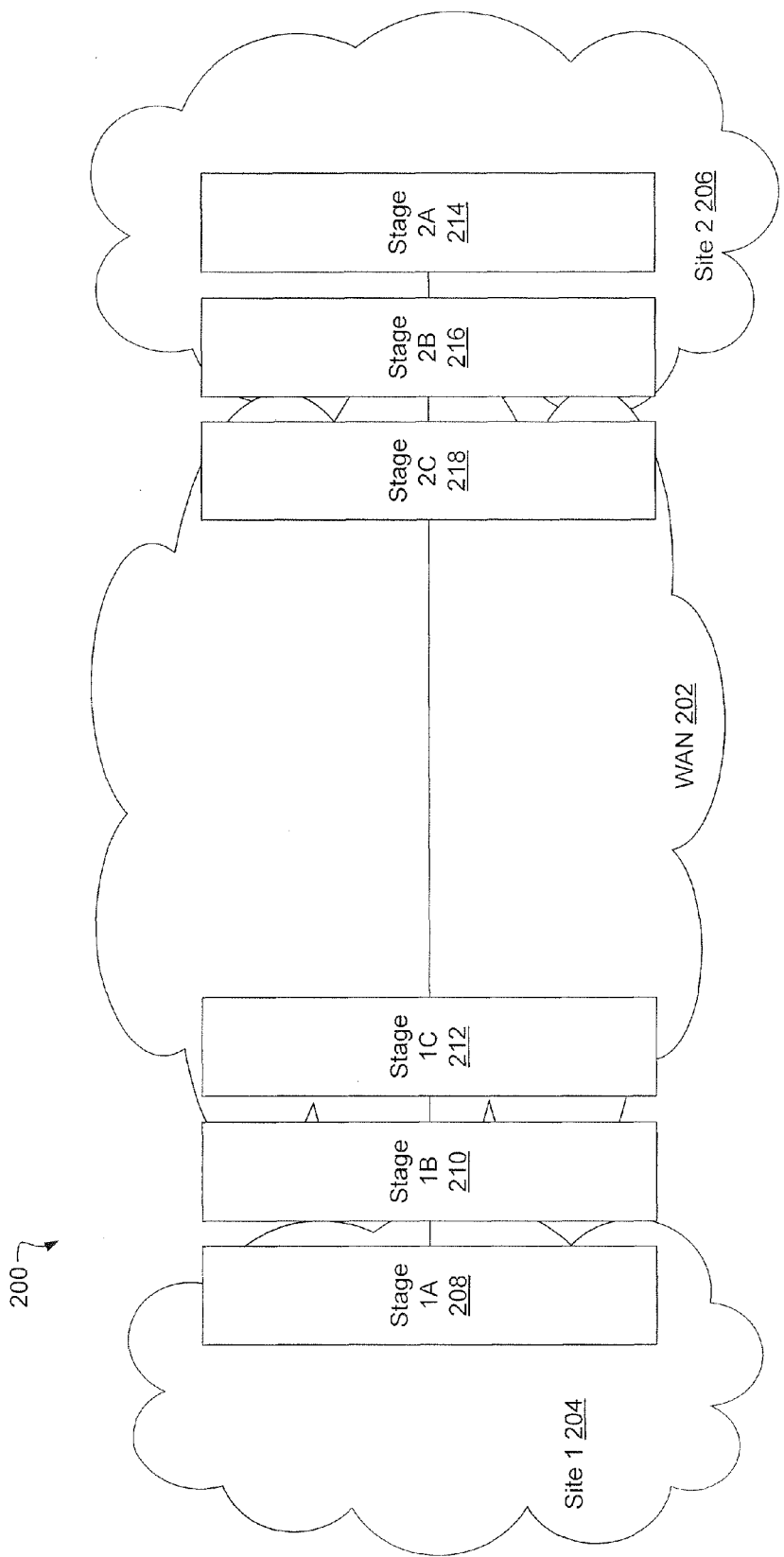
FIG. 2 illustrates an exemplary multi-stage switching system in accordance with various embodiments.

FIG. 2 illustrates an exemplary network configuration 200 including a wide area network 202 communicatively coupled to a first network site 204 and a second network site 206. A set of switch stages communicatively couples the network sites to the WAN 202. For example, stage 1A 208, stage 1B 210 and stage 1C 212 facilitate communications between the WAN 202 and the first network site 204. Stage 2A 214, stage 2B 216 and stage 2C 218 facilitate communications between WAN 202 and the second network site 206.

The embodiment of FIG. 2 can be applied to more than two network sites. Switch stages may be added or removed. The network sites may be different enterprise sites, metropolitan area networks, campus area networks or others. Many different network topologies may be implemented within each of the stages, as well as between the network sites. Exemplary embodiments are discussed below.

Figure 3:
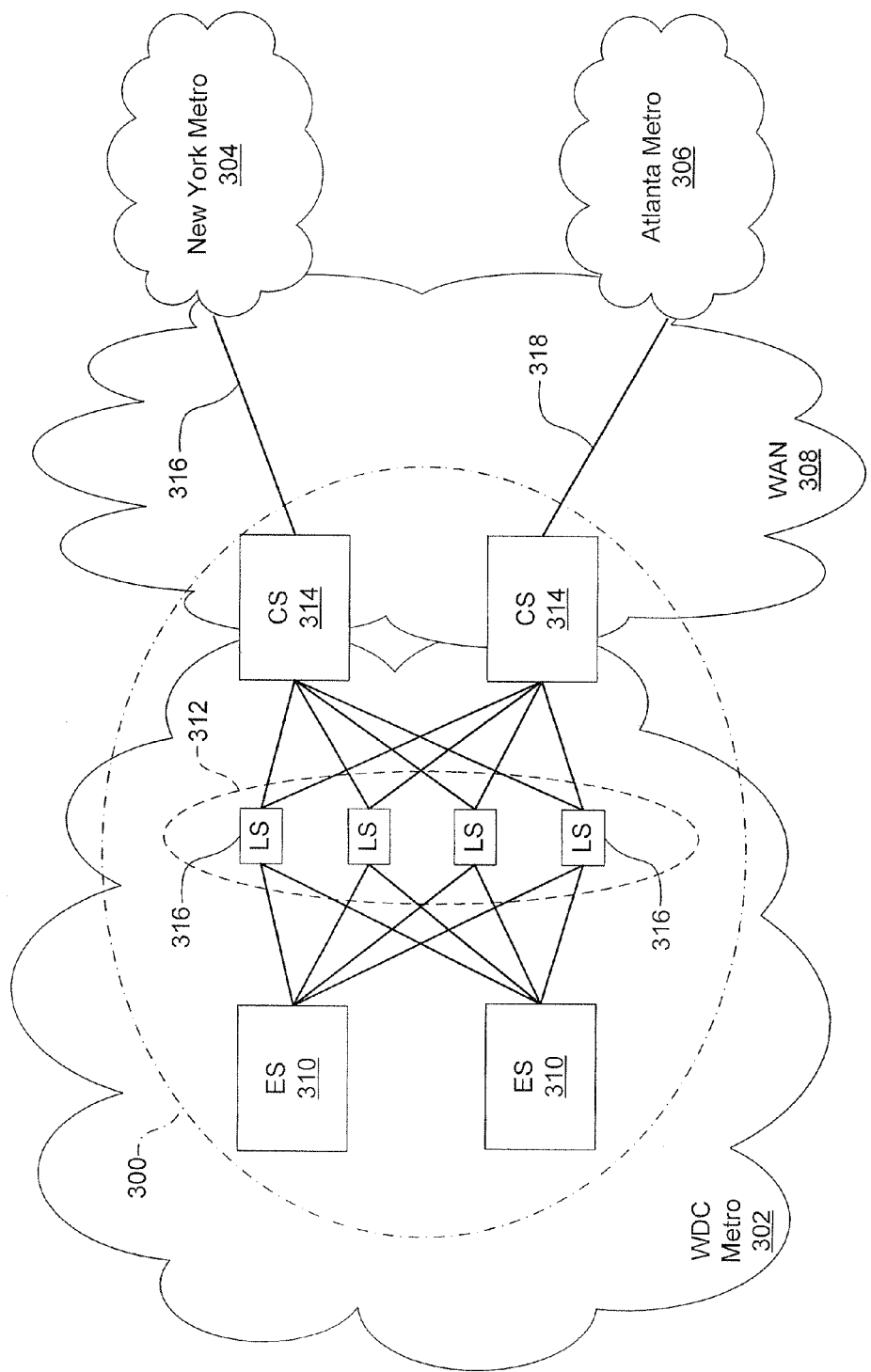
FIGS. 3-4 illustrate other exemplary multi-stage switching systems applied to metropolitan areas in accordance with various embodiments.

FIG. 3 illustrates an exemplary switching system 300 in accordance with the embodiment of FIG. 2. This embodiment generally depicts three metropolitan area networks, Washington D.C. 302, New York City 304 and Atlanta 306, communicatively coupled over a WAN 308. The switching system 300 resides generally between the WDC network 302 and the WAN 308.

The switching system 300 has a first stage of provider edge switches 310 (e.g., edge routers), a middle stage including a local interconnect matrix (LIM) 312, and a third stage of provider core switches 314 (e.g., core routers). The LIM 312 includes a cluster of LIM switches (LS) 316. In the exemplary embodiment, the switching system 300 links the Washington D.C. metro network 302, the New York metro network 304 and the Atlanta metro network 306 via link bundle 316 and link bundle 318, respectively (link bundles are shown with thicker lines). The links between the LIM switches 316 are also link bundles, and, in some embodiments, may comprise 4 parallel 10 Gig-E links.

The core switches 314 form a core stage of switches and the edge switches 310 form an edge stage of switches. In some embodiments, the LIM switches 316 can comprise multiple stages of switches. Only one stage is illustrated in FIG. 3 for ease of description.

In one embodiment, the edge switches 310 form a first stage in a Clos-like matrix, the LIM 312 forms a second stage in the matrix, and the core switches 314 form a third stage in the matrix. In other embodiments, more stages may be included. For example, the local interconnect matrix 312 may include multiple switch stages in any topology. The stage or stages of the LIM 312 may include an aggregation layer that provides intelligent packet buffering or other functionality. For example, more complex functionality that is often attributed to commercial routers, such as Quality of Service (QoS), may be incorporated into the LIM 312. The LIM 312 may also perform Equal-cost Multi-path (ECMP) routing to balance the traffic load across edge switches 310 and core switches 314.

The switches 316 of the LIM 312 may form one or more meshes, which may be of one or more different topologies. Such alternate mesh topologies may or may not include a Clos-like matrix. By way of example, but without limitation, a mesh of switches 316 may form an equal Clos path or an N×M Clos matrix. For example, the Clos matrix may be made up of a number of stages of switches 316, in which each stage is made up of the same or a different number of parallel switches. Alternatively, the switches 316 of the LIM 312 may be in ring, star, n-cube, toroidal, full mesh, partial mesh, arbitrary mesh, or hybrid topologies.

In one embodiment the LIM 312 is Clos-like, with each edge switch 310 connecting to the center stage with different capacity according to the edge switch's 310 bandwidth requirements. In this embodiment it is not strictly a Clos matrix, as each element may have differing bandwidth that can vary over time, and the LIM 312 can be blocking.

The switches 316 may be pure layer 2 or hybrid layer 2/layer 3. The switches 316 of the switch fabric may each be configured with its own broadcast LAN facing the edge switches 310. The edge switches 310 can set up adjacencies for protocols not necessarily carried by the switches 316, such as MPLS.

In one embodiment of the switching system 300, the edge switches 310, local interconnect matrix 312 and core switches 314 are each comprised of independent switching elements in separate chassis. In this embodiment, the output ports of each switch 316 are coupled to input ports of core switches 314, and vice versa. Similarly, output ports of each edge switch 310 are coupled to input ports of the switches 306, and vice versa. In this regard, each switch 316 in the middle stage has multiple ports logically facing the WAN, which are each connected to a port of a core switch 314; and each switch 316 in the middle stage has multiple port logically facing the metropolitan (or local) network, which are each connected to a port on an edge switch 310.

With regard to data (e.g., packet) forwarding through the switching system 300, the configuration shown in FIG. 3 can be loosely coupled, whereby edge switches 310 do not need to be capable of selecting a port on a core switch 314 through which to forward data, and vice versa. The edge switches 310 and core switches 314 can perform simple next-hop forwarding through the LIM 312. In addition, a nonproprietary protocol can be used for packet forwarding at each stage, and chassis slots and ports are available for connection and reconnection of components. For example, the core switches 314 may use a layer 2 (e.g., Ethernet) or layer 2½ switching protocol (e.g., MPLS), rather than a layer 3 routing protocol (e.g., Internet protocol). In some embodiments, the LIM switches 316 are relatively simple commodity switches. The open protocol and decoupling of core switches 314 from edge switches 310 can enable flexible scaling in the LIM 312, as well as at the edge and the core.

Such a configuration allows for greater flexibility with regard to component selection and interconnection. For example, individual components at each stage can be selectively interchanged. In addition, the components may be from different vendors or different generations of at different stages of the system 300. For example, edge switches 310 could be simple commodity switches, or edge switches 310 could be more sophisticated routers, such as Juniper™ routers. Similarly, core routers 314 could be simple commodity switches, or more sophisticated routers, such as Cisco™ routers.

The configuration shown in FIG. 3 also allows for greater degrees of data protection at substantially the same throughput and potentially lower cost than conventional configurations. At a minimum, the multi-stage, multi-chassis configuration provides a network capacity of N times CSW, where N is the number of switches 306 in the local interconnect matrix 304, or a network capacity of N−1 times CSW with data protection. In this context, CSW refers to uplink LAG capacity to the core switch or uplink bundle capacity to the core switch. For example, with 4 switches in the inner stage, network capacity is 4 times CSW. Further efficiency is gained by local switching within the ES 310 and CS 314 stages.

In contrast to a conventional implementation with a tightly coupled control plane, the described embodiments can allow for higher system reliability, in part because the control and forwarding protocol functions are loosely coupled and can operate independently. This enables the use of N:1 protection of the ES 310 and CS 314 uplinks in contrast to a less efficient 1:1 protection of uplinks to a traditional node design with dual core routers. For example with 4 uplinks, if there is 1:1 protection 2 uplink are available for working traffic while 2 uplinks are required for protection. If there is 3:1 protection, one link bundle is required for redundancy, and the network capacity is 3 uplinks. This uplink efficiency reduces costs on the ES as well as increasing the capacity of the overall system.

Figure 4:
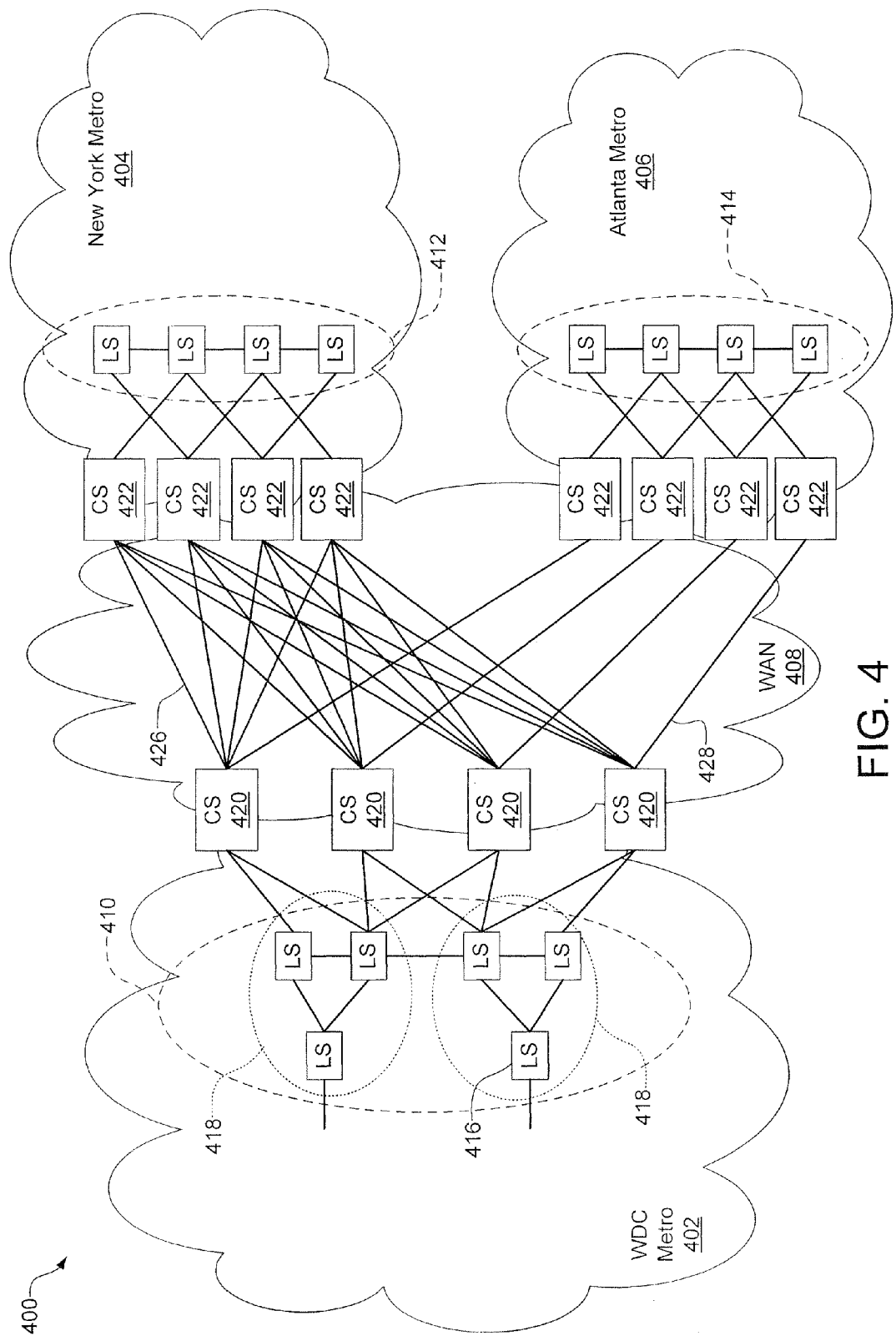
Figure 5A:
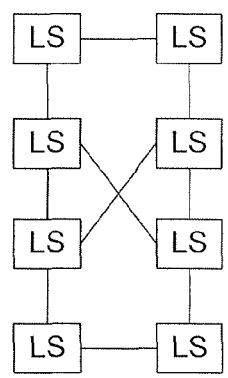
FIGS. 5A-5D illustrate exemplary local interconnected matrix (LIM) switch topologies.
Figure 5B:
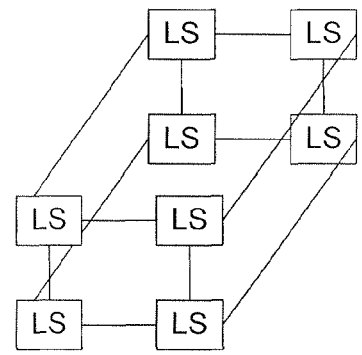
Figure 5C:
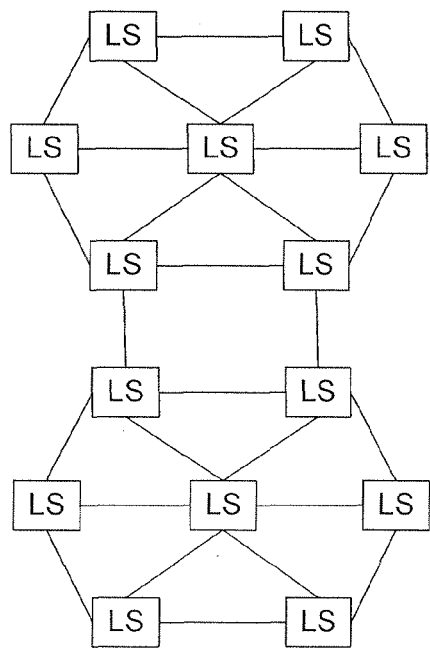
Figure 5D:
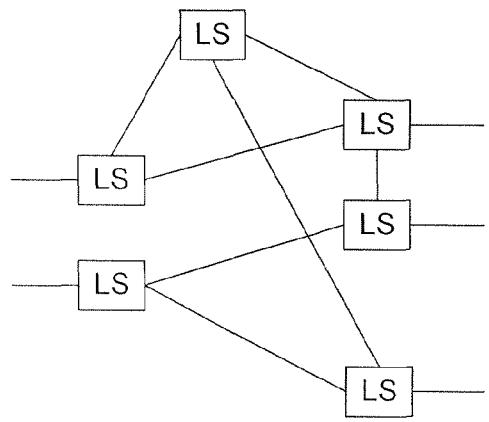

FIG. 4 illustrates another exemplary multi-stage switching system 400 in accordance with various embodiments. The particular embodiment illustrates variations on the basic LIM configuration. In addition, the mesh of a LIM at an edge network (e.g., a POP) may be extended across a wide area network (WAN). Such variations are illustrated in FIG. 4.

FIG. 4 again illustrates metropolitan networks in Washington D.C. 402, New York City 404 and Atlanta 406 communicatively coupled via a WAN 408. Switch stages are shown at each of the metro areas. One of the stages at each metro area is a LIM. for example, there is a WDC LIM 410, a NYC LIM 412, and an Atlanta LIM 414. Each of the metro areas has core switches as well.

LIM switches may be arranged in any of a number of topologies. For example, in the illustrated embodiment, the WDC LIM switches 416 are arranged as two n-cube configurations 418. It is to be understood that any type of configuration can be used in a LIM, including, but not limited to, full mesh, partially connected mesh, star, ring, toroid, arbitrary mesh, or any combination thereof (e.g., hybrid configurations). Some exemplary topologies are shown in FIG. 5.

Referring to FIG. 5, there are shown just a few possible topologies for LIMs. FIG. 5A illustrates a partially connected mesh of switches. FIG. 5B illustrates a toroid topology. FIG. 5C illustrates a star ring topology. FIG. 5D illustrates and arbitrary mesh topology. Of course, the invention is not limited to any of these, and hybrid topologies can be implemented. The choice of the LIM switch configuration may depend on numerous factors, such as traffic volume, cost of infrastructure, location or others.

In the illustrated embodiment, the WDC core switches 420 are coupled to switches 422 in the New York City metro network 404 and switches 424 in the Atlanta metro network 406 via link bundles 426 and 428, respectively. This linking configuration, in which the LIM mesh is extended out across the WAN is referred to as "braided". The braided configuration can enable efficient communication switching in the WDC network 402 for traffic between the New York City network 404 and the Atlanta network 406. This configuration enables the WAN through traffic to be locally switched in the CS 420. This reduces the CS 420 uplink capacity requirements to the LIM 410 and so allows for increasing the number of core switches 420 (e.g., scaling up) in response to traffic increases in either metro market. The braiding concept can be extended across multiple WAN hops and throughout the entire network. In one embodiment, referred to as a "ladder" configuration, the braiding is implemented as parallel links between different metro locations and the parallel braiding is continued across multiple hops throughout the network. In this embodiment the CS 420 switches may be reside in different locations within the metro and the parallel links may be routed over diverse fiber paths to enable efficient protection within the WAN In an alternative embodiment, the core switches may be directly linked to the center stage; e.g., the LIM stage of other metro networks. For example, the core switches 420 can be directly connected to the switches in the NYC LIM 412. Further still, in another embodiment, middle stages may be directly connected to other middle stages. For example, the WDC core the LIM switches 416 can be directly linked to the switches of the NYC LIM 412 and the Atlanta LIM 414.

Figure 6:
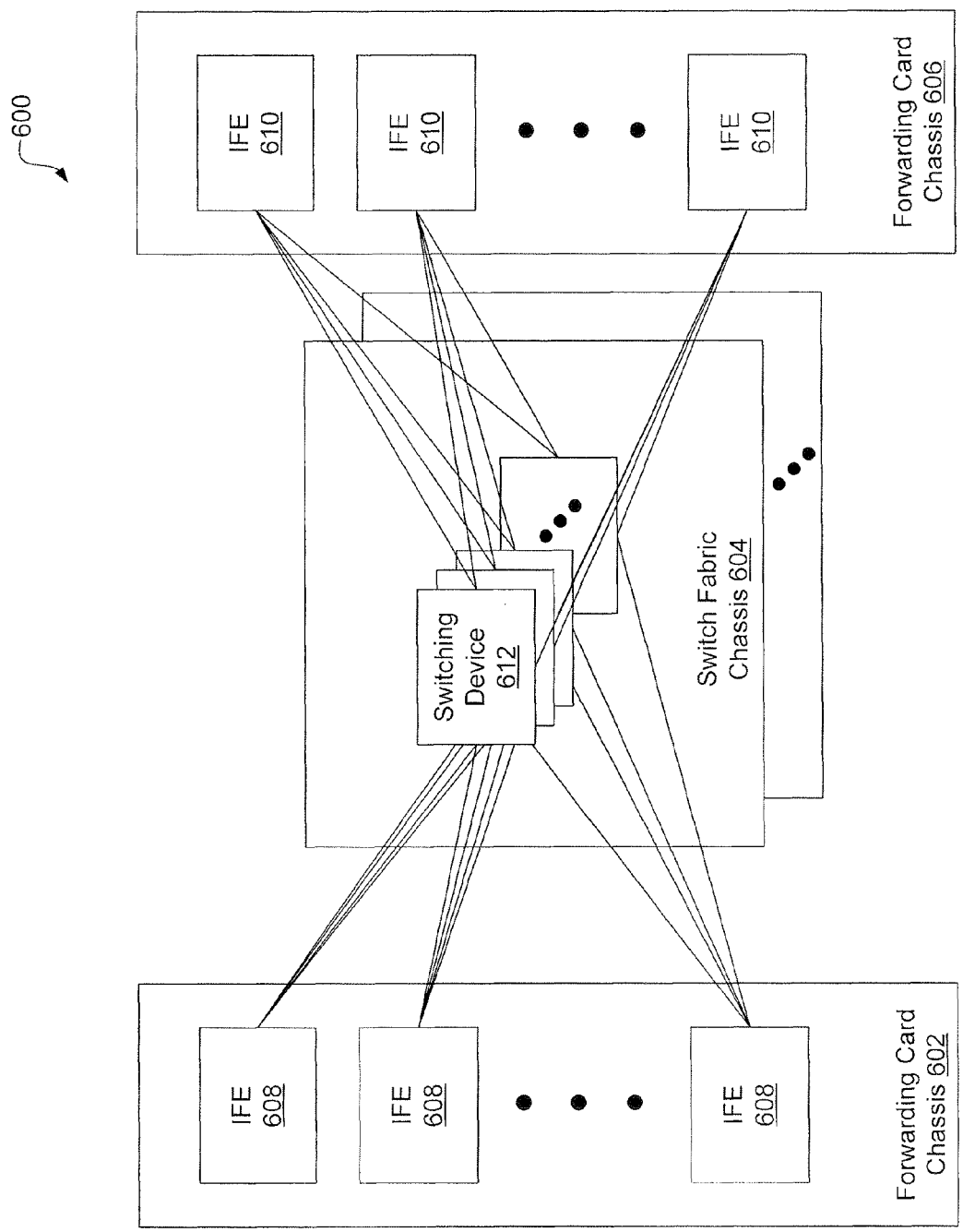
FIG. 6 illustrates an exemplary multi-stage, multi-chassis switching system employing scalable packet forwarding in accordance with various embodiments.

FIG. 6 illustrates an exemplary multi-chassis switching system 600 in accordance with one embodiment. The multi-chassis switching system 600 includes a first forwarding card chassis 602, a switch fabric chassis 604 and a second forwarding card chassis 606. Forwarding card chassis 602 includes a plurality of independent forwarding elements (IFE) 608 and forwarding card chassis 606 includes another plurality of IFEs 610. The IFEs 608 and IFEs 610 are independent of the other IFEs. Each IFE has its own forwarding table, which may be built using a link advertising protocol. Switch fabric 604 includes a cluster of multiple parallel switching devices 612. In some embodiments, the cluster of switching devices form a local interconnect matrix (LIM).

The switching devices 612 perform parallel switching of packets (or datagrams or frames) between IFEs 608 and IFEs 610. In one embodiment, the switching fabric 612 includes a designated number (e.g., 4, 8) of Ethernet switches connected in such a way to form one or more stages of a Clos-like matrix. The system in this embodiment may be blocking or non-blocking. The components of the system 600 (i.e., forwarding card chassis 602, switch chassis 604 and forwarding card chassis 606) are divided into separate chassis that are individually accessible and functionally independent. In addition, packets can be forwarded through the switching system 600 using IP protocol or another protocol that is not proprietary. As such, the embodiment shown in FIG. 6 allows for easy upgrading and scalability to the system 600.

In addition, functionality can be included in the switch devices 612 for performing higher level functions in addition to switching. For example, switch devices 612 can perform buffering. As another example, switch devices 612 can make switching decisions based on demand and capacity. That is, the switch devices 612 can determine demand placed on other stages of the system and make traffic forwarding decisions based on that demand and available and/or necessary capacity.

Stages in the switching fabric 604 can receive demand or capacity information from other stages via traffic engineering tunnels (e.g., MPLS tunnels) or via layer two VLANs. Alternatively, changes to IGP can be leveraged to communicate bandwidth information to the switching stage 604. For example, a "downstream" stage switch can communicate to upstream stage switches (e.g., via IGP or other protocols) that it is connected to a New York-based site with 30 Gb/s of traffic. The upstream stage switches can use this protocol information, as well as information about other switches, to perform load balancing across stages of the switch fabric 604.

With regard to the IFEs 608, packet forwarding is simplified and scalable. In the illustrated embodiment, the line cards serve as Ethernet switch interconnects. Packet forwarding through the IFEs 608 is a "next-hop" decision, meaning that the IFEs 608 only need to determine which port on the switch devices 612 to forward the packet to. For example, if the switch fabric 604 includes a 4×4 parallel cluster of Ethernet switches, the line cards only need to determine which of the 4 ports in the first stage of the switch fabric 604 to forward the packets to. As such, the forwarding table in the IFE 608 only needs an entry for each port connected to the next stage. However, the forwarding table may still be a complete forwarding table. The IFE 608 can perform load balancing across the switch devices 612, for example, by performing round robin distribution or some other load balancing policy.

Exemplary Operations

Figure 7:
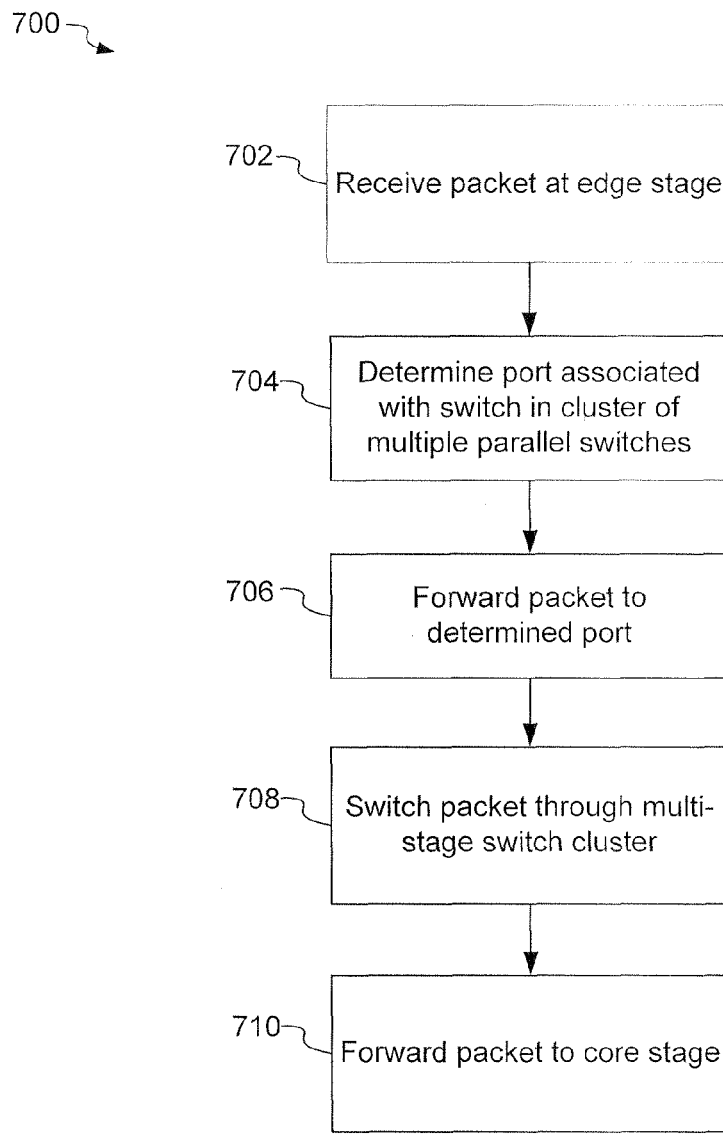
FIG. 7 is a flowchart illustrating a process of switching a packet through a multi-stage switching system including a LIM.

FIG. 7 is a flowchart illustrating an algorithm for switching a packet through a multi-stage and/or multi-chassis switching system such as those shown in FIGS. 1-6. For ease of illustration, it is assumed that a middle stage cluster of parallel switches is communicatively coupled between an initial stage and a final stage of the switching system. It will be understood that numerous other switch topologies may be used.

Initially in a receiving operation 702 a packet is received at a first stage of the switching system. The first stage may include one or more routers, one or more forwarding elements, or switches. In a determining operation 704 it is determined which port in the next stage the packet should be forwarded to. The determining operation 704 may involve a table look up using a next hop IP address to determine which of N ports to forward the packet. The determining operation 704 may also perform flow load balancing if multiple links exist between the switch and the next stage. A forwarding operation 706 forwards the packet to the determined port in a parallel cluster of switches.

A switching operation 708 switches the packet through 1 or more stages of the parallel switch cluster. The switching may involve the MPLS protocol or other buffered protocol. At each switch, ternary content addressable memory (TCAM) is typically accessed to determine the next port to forward the packet to. In another forwarding operation 710, the packet is forwarded to a core stage in the network. From the core stage, the packet can be forwarded to its destination through a backbone or other wide area network.

In an alternative embodiment, in which middle LIM stages of different metropolitan areas are connected, the switching operation 708 may forward the packet directly to a parallel switch cluster (or other middle stage LIM) of another metropolitan area. In this embodiment, the packet bypasses core routers or switches enroute to the destination metropolitan area.

Exemplary Computing Device

Figure 8:
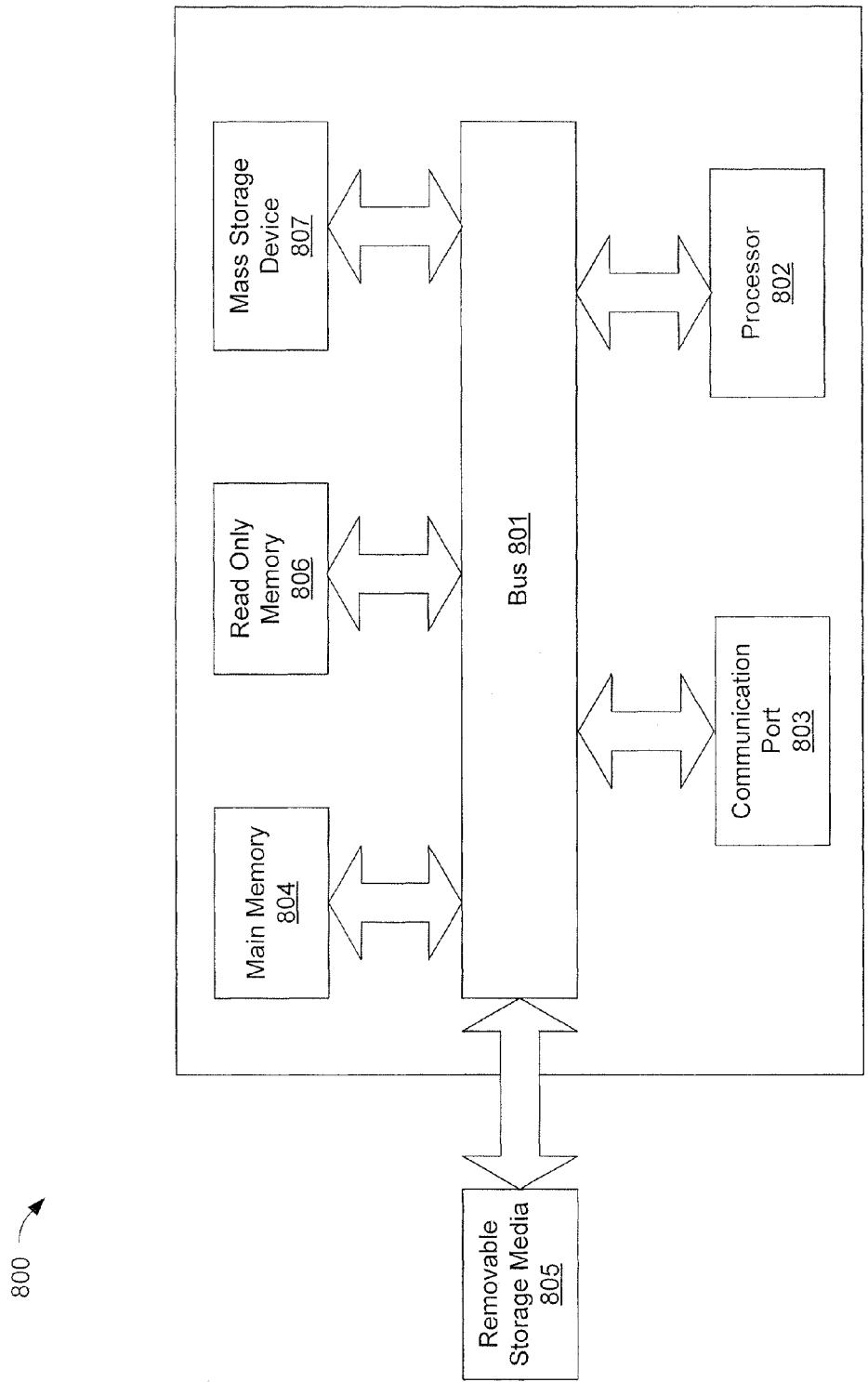
FIG. 8 illustrates a general purpose computing device upon which one or more aspects of embodiments of the present invention may be implemented.

FIG. 8 is a schematic diagram of a computing device 800 upon which embodiments of the present invention may be implemented and carried out. For example, the computing device 800 may be located at an initial stage of a network and perform packet forwarding. As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

According to the present example, the computing device 800 includes a bus 801, at least one processor 802, at least one communication port 803, a main memory 804, a removable storage media 805, a read only memory 806, and a mass storage 807. Processor(s) 802 can be any known processor, such as, but not limited to, an Intel® Itanium® or Itanium 2® processor(s), AMD® Opteron® or Athlon MP® processor(s), or Motorola® lines of processors. Communication port(s) 803 can be any of an RS-232 port for use with a modem based dialup connection, a 10/100 Ethernet port, a Gigabit port using copper or fiber, or a USB port. Communication port(s) 803 may be chosen depending on a network such a Local Area Network (LAN), Wide Area Network (WAN), or any network to which the computing device 800 connects. The computing device 800 may be in communication with peripheral devices (not shown) such as, but not limited to, printers, speakers, cameras, microphones, or scanners.

Main memory 804 can be Random Access Memory (RAM), or any other dynamic storage device(s) commonly known in the art. Read only memory 806 can be any static storage device(s) such as Programmable Read Only Memory (PROM) chips for storing static information such as instructions for processor 802. Mass storage 807 can be used to store information and instructions. For example, hard disks such as the Adaptec® family of SCSI drives, an optical disc, an array of disks such as RAID, such as the Adaptec family of RAID drives, or any other mass storage devices may be used.

Bus 801 communicatively couples processor(s) 802 with the other memory, storage and communication blocks. Bus 801 can be a PCI/PCI-X, SCSI, or USB based system bus (or other) depending on the storage devices used. Removable storage media 805 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

Embodiments of the present invention include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A switching system coupling an external network to a wide area network, the system comprising:
    a plurality of edge switches communicatively coupled to the external network; a plurality of core switches communicatively coupled to the wide area network; and
    an interconnected matrix of switches communicatively coupled to the core switches and the edge switches and configured to forward communication traffic between the edge switches and the core switches; and
    wherein the interconnected matrix of switches comprises multiple stages of switches;
    wherein each of the edge switches, core switches and interconnected matrix of switches is an independent switching element associated with a forwarding protocol configured to operate independently from one another;
    wherein each of the edge switches, core switches and interconnected matrix of switches develops a forwarding table by exchanging route information with the other switches; and
    wherein each of the interconnected matrix of switches is configured with its own broadcast local area network (LAN) facing the edge switches.

2. The system of claim 1, wherein the interconnected matrix of switches comprises one or more of a full mesh, a partial mesh, a star, a ring, a n-cube, a toroid, a CLOS-like matrix, or an arbitrary mesh configuration.

3. The system of claim 1, wherein the switches in the interconnected matrix forward communication traffic using one or more of an Ethernet protocol, an MPLS protocol, or a nonproprietary protocol.

4. The system of claim 1, wherein the interconnected matrix of switches comprises a Local Area Network (LAN).

5. The system of claim 1, wherein the external network comprises one of a metropolitan area network, a campus area network, an enterprise network or a personal area network.

6. The system of claim 1, wherein the edge switches and the core switches forward communication traffic using one or more of an Ethernet protocol, an MPLS protocol, an Internet Protocol, or a nonproprietary protocol.

7. The system of claim 1, wherein each of the edge switches and the core switches includes its own forwarding table.

8. The system of claim 1, wherein the interconnected matrix of switches comprises ports facing the wide area network and ports facing the external network, and wherein each of the ports facing the wide area network are connected to a port on a core switch and each of the ports facing the external network are connected to a port on an edge switch.

9. The system of claim 1, wherein the edge switches, the interconnected matrix of switches, and core switches are housed in separate chassis.

10. The system of claim 9, wherein the plurality of edge switches comprises an edge switching stage, the interconnected matrix of switches comprises one or more middle switching stages, and the plurality of core switches comprises a core switching stage.

11. The system of claim 10, wherein the independent switching elements are scaled according to the number of switches at each stage in the interconnected matrix of switches.

* * * * *